United States Patent
Hata et al.

(10) Patent No.: US 7,222,342 B2
(45) Date of Patent: May 22, 2007

(54) EXECUTION ON A MACHINE, THE START OF AN AUXILIARY DOWNLOADER WHEN STORAGE OF NEW SOFTWARE MEMORY FAILS DURING EXECUTION OF A FIRST DOWNLOADER

(75) Inventors: Tadashi Hata, Ebina (JP); Satoshi Ono, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 585 days.

(21) Appl. No.: 10/370,591

(22) Filed: Feb. 24, 2003

(65) Prior Publication Data
US 2003/0163805 A1    Aug. 28, 2003

(30) Foreign Application Priority Data
Feb. 27, 2002  (JP)  ............................. 2002-051030
Dec. 20, 2002  (JP)  ............................. 2002-370388

(51) Int. Cl.
G06F 9/44    (2006.01)

(52) U.S. Cl. ....................... 717/173; 717/178; 709/222; 714/2

(58) Field of Classification Search ................. 717/173, 717/178, 168; 709/220, 221, 222; 714/2
See application file for complete search history.

(56) References Cited

U.S. PATENT DOCUMENTS

| | | | | |
|---|---|---|---|---|
| 5,519,834 A * | 5/1996 | Kamerman et al. | ......... | 709/225 |
| 6,330,670 B1 * | 12/2001 | England et al. | ................. | 713/2 |
| 6,484,315 B1 * | 11/2002 | Ziese | ......................... | 717/173 |
| 6,594,757 B1 * | 7/2003 | Martinez | ....................... | 713/2 |
| 6,601,212 B1 * | 7/2003 | Guha et al. | ................. | 714/776 |
| 6,629,284 B1 * | 9/2003 | Leermakers | ................. | 714/748 |
| 6,658,576 B1 * | 12/2003 | Lee | ............................. | 713/320 |
| 6,704,933 B1 * | 3/2004 | Tanaka et al. | ............... | 725/132 |
| 6,754,765 B1 * | 6/2004 | Chang et al. | ................ | 711/103 |
| 6,773,325 B1 * | 8/2004 | Mawle et al. | ................ | 446/175 |
| 6,785,885 B2 * | 8/2004 | Norris et al. | ................ | 717/178 |

(Continued)

FOREIGN PATENT DOCUMENTS

| JP | A 5-44510 | 2/1996 |
|---|---|---|
| JP | A 11-259305 | 9/1999 |

OTHER PUBLICATIONS

"Lucent Rides the Open Highway Beta Version of Inferno debuts On the Internet", Chris, Bucholtz, Telephony Online, Jul. 26, 1996, 2 pages.*

(Continued)

*Primary Examiner*—Todd Ingberg
(74) *Attorney, Agent, or Firm*—Oliff & Berridge, PLC

(57) ABSTRACT

A download method comprises an auxiliary downloader storing step for storing an auxiliary downloader 38 in a storage unit by executing a downloader 22 stored in the storage unit, a new software storing step for storing new software 40 in a region of the storage unit other than the storage region where the auxiliary downloader 38 is stored, and a downloader starting step for executing the auxiliary downloader 38 in the event of failure of the storage of the new software 40.

15 Claims, 14 Drawing Sheets

U.S. PATENT DOCUMENTS

| | | | |
|---|---|---|---|
| 6,918,113 B2* | 7/2005 | Patel et al. | 717/178 |
| 6,928,468 B2* | 8/2005 | Leermakers | 709/221 |
| 6,963,993 B1* | 11/2005 | Semancik et al. | 714/2 |
| 6,973,478 B1* | 12/2005 | Ketonen et al. | 709/203 |
| 7,047,287 B2* | 5/2006 | Sim et al. | 709/221 |
| 7,058,014 B2* | 6/2006 | Sim | 370/230 |
| 7,076,553 B2* | 7/2006 | Chan et al. | 709/226 |
| 7,096,263 B2* | 8/2006 | Leighton et al. | 709/224 |
| 7,165,095 B2* | 1/2007 | Sim | 709/217 |

OTHER PUBLICATIONS

"Home is Where Inferno is: New Version of Lucent Software Will Suport Customer-Focused Java App", Chris Bucholtz, Telephony Online, Sep. 22, 1997, 3 pages.*

"Lucent Technologies' New Inferno 2.0 Software Supports PersonalJava Applications On Customer Products", Lucent Technologies, Nov. 17, 1997, 2 pages.*

* cited by examiner

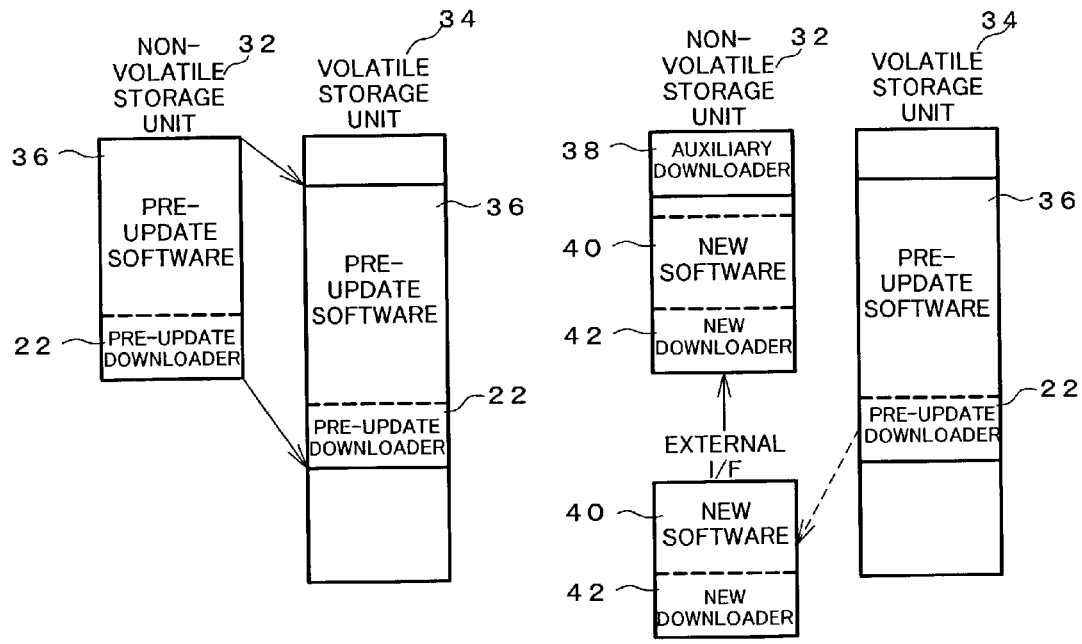
FIG. 3A
FIG. 3C
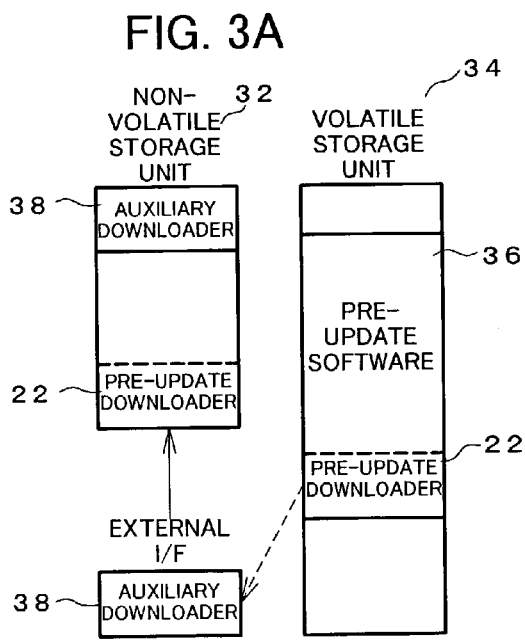
FIG. 3B
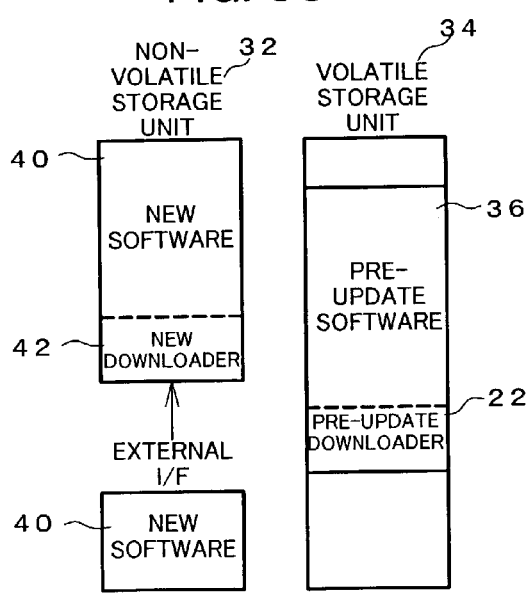
FIG. 3D

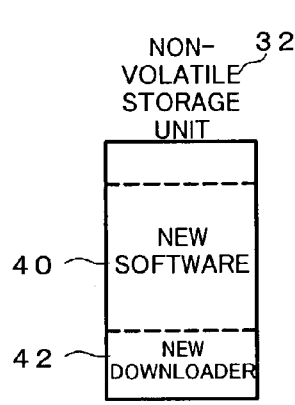 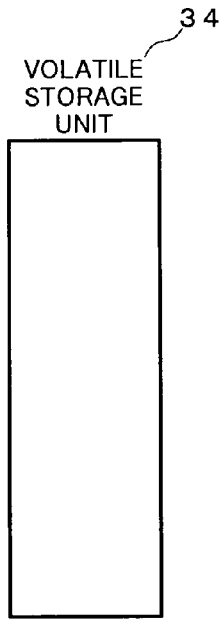 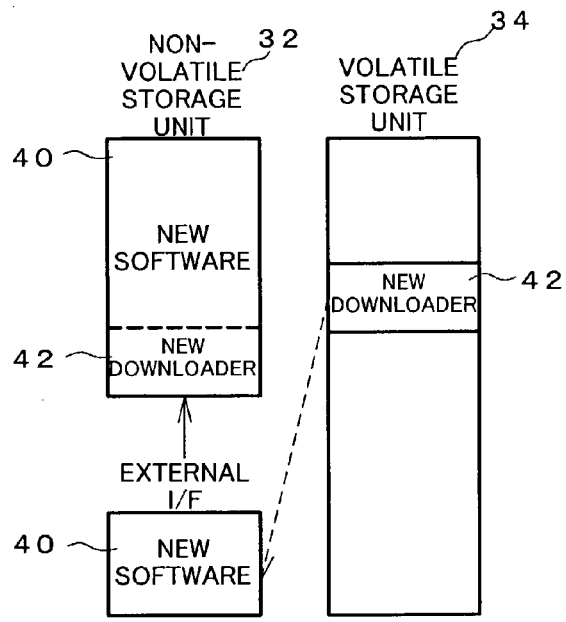 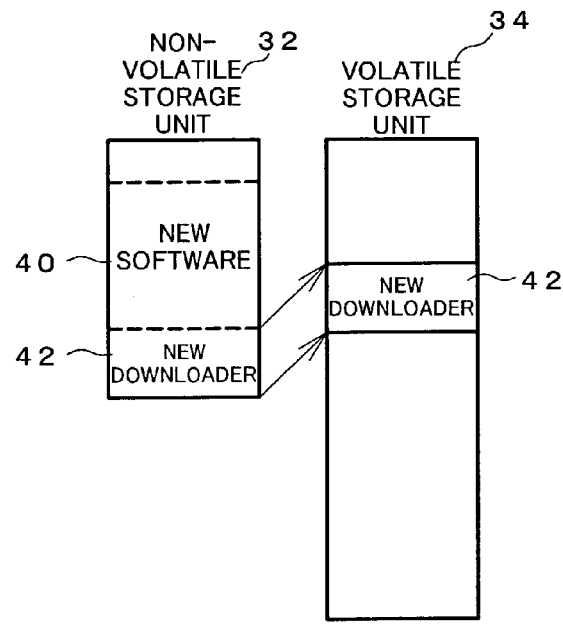
FIG. 5A
FIG. 5C
FIG. 5B

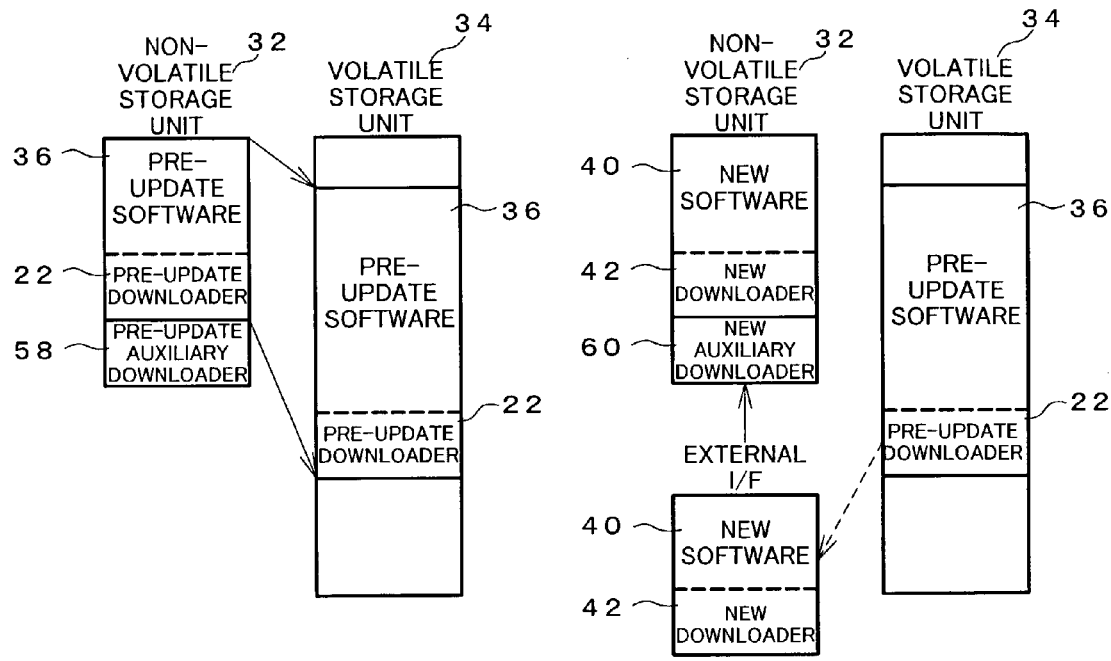
FIG. 12A
FIG. 12C
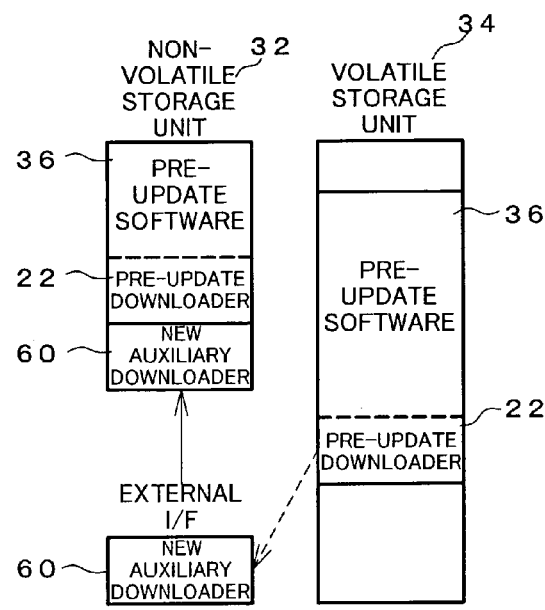
FIG. 12B

US 7,222,342 B2

EXECUTION ON A MACHINE, THE START OF AN AUXILIARY DOWNLOADER WHEN STORAGE OF NEW SOFTWARE MEMORY FAILS DURING EXECUTION OF A FIRST DOWNLOADER

BACKGROUND OF THE INVENTION

1. Field of the Invention

The present invention relates to a download method and a download program product for storing software in an information processing apparatus having a storage unit, and to a recording medium for the download program.

2. Description of Related Art

In information processing apparatuses such as computers, a control program contained in software which is stored in a storage unit such as a semiconductor memory is executed by a processing unit such as a central processing unit (CPU).

In such information processing apparatuses, important software is stored in a non-volatile storage unit so as to retain its content even when the supply of power to the apparatus is interrupted. For such information processing apparatuses, minimization of size, weight, and price are all desired in order to allow the apparatuses to be installed into various devices.

To add new functionality or change the functions of the information processing apparatus, it is necessary to update the programs included in the software stored in the non-volatile storage unit. The software updating is performed by a downloading or download process, in which new software is imported from an external apparatus via communication networks or the like, and the existing software stored in the nonvolatile storage unit is overwritten with the new software. Such a download process for new software is accomplished by executing a download processing program, hereinafter referred to as a downloader.

It is necessary that the download process for rewriting software, which is a main function of an information processing apparatus, continue to operate stably and reliably, even when the download process is halted due to unusual circumstances, such as disconnection or interruption of the power supply. Further, it is also desired that operation of the download process be simple and high-speed.

Japanese Patent Laid-Open Publication (Kokai) No. Hei 8-44510 discloses a printing machine software executing apparatus and a method of changing printing machine software using the apparatus.

Referring to FIG. 7, an information processing apparatus according to Kokai No. Hei 8-44510 comprises a processing unit 10, a downloader storage unit 12, a software storage unit 14, and an external interface (external I/F) 16, which are interconnected via a data bus 20 so as to allow mutual data transfer. The downloader storage unit 12 and the software storage unit 14 store a downloader and software, respectively. Both the downloader storage unit 12 and the software storage unit 14 are non-volatile storage units, and the software storage unit 14 is rewritable.

On the other hand, in order to receive new software, the information processing apparatus is connected, via the external I/F 16, to an external apparatus 18 which provides new software to the information processing apparatus.

FIGS. 8A and 8B illustrate the content stored in the downloader storage unit 12 and the software storage unit 14 during a normal operation and a download process, respectively. When the apparatus is under normal control, the processing unit 10 executes ordinary operations under the control of a control program contained in software 24 stored in the software storage unit 14, as shown in FIG. 8A. During the download process, as shown in FIG. 8B, the processing unit 10 executes the download operation according to a pre-update downloader 22 stored in the downloader storage unit 12, and downloads new software 26 from the external apparatus 18 to the software storage unit 14 via the external interface 16. The software in the software storage unit 14 is thus updated.

According to the above configuration, even when the download process is terminated due to a failure such as a power interruption, the pre-update downloader 22, which is stored in the non-volatile downloader storage unit 12, is not erased. Therefore, it is possible to continue the download process when the processing unit 10 once again executes the pre-update downloader 22 stored in the downloader storage unit 12 after the system is recovered.

Japanese Patent Laid-Open Publication (Kokai) No. Hei 11-259305 discloses "a remote program download apparatus".

FIG. 9 is a block diagram showing a configuration of a download apparatus of Kokai No. Hei 11-259305. FIGS. 10A to 10D illustrate the content stored in the downloader storage unit 12 and the software storage unit 14. Under normal control, as shown in FIG. 10A, the processing unit 10 executes a normal operation by a control program contained in software 24 stored in the software storage unit 14.

A download process is carried out in a manner described below. First, as shown in FIG. 10B, a pre-update downloader 22 which is stored in the downloader storage unit 12 is executed, so that new downloader 30 is downloaded via the external interface 16 and written over the software stored in a storage region of the software storage unit 14 which is not used for the download process. Then, as shown in FIG. 10C, the new downloader 30 is transferred to the downloader storage unit 12 by the remaining software in the software storage unit 14, and written over the pre-update downloader 22. Finally, the new software 26 is downloaded by the new downloader 30 via the external interface 16 and stored in the download storage unit 12, and the downloaded new software 26 is written in a region of the software storage unit 14 other than the region where the new downloader 30 is stored, overwriting any data previously stored in that region.

As in the example of Kokai No. Hei 8-44510, according to the above configuration of Kokai No. Hei 11-259305, the downloader stored in the downloader storage unit 12 or the software storage unit 14, which is a non-volatile storage unit, is not erased even when the download process is fails due to circumstances such as disconnection of the power source for the download apparatus, thereby enabling continuous downloading after recovery of the apparatus. In particular, even when the power supply to the apparatus is interrupted while the new downloader 30 is executed to download the new software 26, the download process can be continuously carried out by executing the new downloader 30 stored in the software storage unit 14.

In the invention disclosed in Kokai No. Hei 8-44510, however, because it is necessary to directly execute the downloader 22 stored in the downloader storage units 12 to update the software, it is not possible to update the pre-update downloader 22 itself.

In the invention disclosed in Kokai No. Hei 11-25930, on the other hand, the pre-update downloader 22 can be updated. However, because it is necessary to execute the new downloader 30 when downloading the new software 26 onto the software storage unit 14, it is always necessary to switch the control of the download process from the pre-update downloader 22 to the new downloader 30, which forces a user to restart the information processing apparatus. The time required for such a shift operation is not insignificant.

Further, in either invention disclosed in the above two references, it is necessary that both the downloader storage unit 12 for storing the pre-update downloader 22 and the software storage unit 14 for storing software be non-volatile storage units. Also, because the download process is performed by directly executing the downloader stored in the non-volatile downloader storage unit 12, it is not possible to store the downloader in a compressed form. As a consequence, the downloader storage unit 12 must have a large capacity, which hampers efforts to reduce the size and weight of the information processing apparatus. In addition, because production of large capacity non-volatile storage units is more difficult to and expensive than production of volatile storage units, the relative manufacturing cost of the apparatus is increased.

SUMMARY OF THE INVENTION

The present invention solves the above-described problems of the related art and provides an information processing apparatus, a download method, and a download program product, all of which are capable of updating software stably and reliably.

In accordance with one aspect of the present invention, there is provided an information processing apparatus having a storage unit in which a downloader is previously stored, the apparatus comprising auxiliary downloader storage means for storing an auxiliary downloader in the storage unit when the downloader stored in the storage unit is executed; new software storage means for storing new software in a region of the storage unit other than the storage region where the auxiliary downloader is stored by the auxiliary downloader storage means; and downloader start means for executing the auxiliary downloader when storage of the new software by the new software storage means fails.

Further, in accordance with another aspect of the present invention, there is provided an information processing apparatus having a storage unit in which a downloader is previously stored, the apparatus comprising auxiliary downloader storage means for storing a first auxiliary downloader which is not compressed in the storage unit and then storing a second auxiliary downloader in a region of the storage unit other than the storage region where the first auxiliary downloader is stored when the downloader stored in the storage unit is executed; new software storage means for storing new software in a region of the storage unit other than the storage region where the first or second auxiliary downloader is stored by the auxiliary downloader storage means; and downloader start means for executing either the first or second auxiliary downloader when storage of the new software by the new software storage means fails.

In accordance with yet another aspect of the present invention, there is provided, in an information processing apparatus having a storage unit in which a downloader is previously stored, a download method for storing new software in the storage unit, the method comprising an auxiliary downloader storing step for storing an auxiliary downloader in the storage unit by executing the downloader stored in the storage unit; a new software storing step for storing new software in a region of the storage unit other than the storage region where the auxiliary downloader is stored; and a downloader starting step for executing the auxiliary downloader when storage of the new software fails.

In accordance with a still further aspect of the present invention, there is provided, in an information processing apparatus having a storage unit in which a downloader is previously stored, a download method for storing new software in the storage unit, the method comprising an auxiliary downloader storing step for storing a first auxiliary downloader which is not compressed in the storage unit and then storing a second auxiliary downloader in a region of the storage unit other than the storage region where the first auxiliary downloader is stored by executing the downloader stored in the storage unit; a new software storing step for storing new software in a region of the storage unit other than the storage region where the first or second auxiliary downloader is stored; and a downloader starting step for executing either the first or second auxiliary downloader when storage of the new software fails.

In accordance with a still further aspect of the present invention, there is provided, in an information processing apparatus having a storage unit in which a downloader is previously stored, a download program product for storing new software in the storage unit, the download program product causing a computer to carry out a process including an auxiliary downloader storing step for storing an auxiliary downloader in the storage unit by executing the downloader stored in the storage unit; a new software storing step for storing new software in a region of the storage unit other than the storage region where the auxiliary downloader is stored; and a downloader starting step for executing the auxiliary downloader when storage of the new software fails.

Further, in accordance with yet another aspect of the present invention, there is provided, in an information processing apparatus having a storage unit in which a downloader is previously stored, a download program product for storing new software in the storage unit, the download program product causing a computer to perform a process comprising an auxiliary downloader storing step for storing a first auxiliary downloader which is not compressed in the storage unit and then storing a second auxiliary downloader in a region of the storage unit other than the storage region where the first auxiliary downloader is stored by executing the downloader stored in the storage unit; a new software storing step for storing new software in a region of the storage unit other than the storage region where the first or second auxiliary downloader is stored; and a downloader starting step for executing either the first or second auxiliary downloader when storage of the new software fails.

BRIEF DESCRIPTION OF THE DRAWINGS

The present invention can be understood more fully from the detailed description given herebelow in connection with the accompanying drawings, in which:

FIGS. 3A to 3D are views showing the content of each storage unit during the download process according to the embodiment of the present invention;

FIGS. 5A to 5C are views showing the content of each storage unit during the download process according to the embodiment of the present invention;

FIGS. 12A to 12C are views showing the content of each storage unit during the download process according to the first modified example of the embodiment of the present invention;

DETAILED DESCRIPTION OF THE PREFERRED EMBODIMENT

<Configuration of Information Processing Apparatus>

Figure 1:
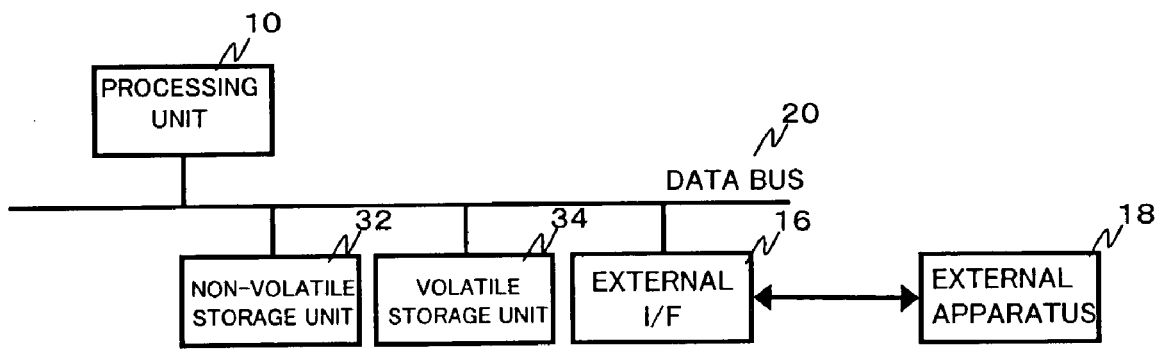
FIG. 1 is a block diagram showing a configuration of an information processing apparatus according to an embodiment of the present invention.

FIG. 1 is a block diagram showing the configuration of an information processing apparatus according to an embodiment of the present invention. The illustrated configuration is an example embodiment and the information processing apparatus of the present invention is not limited to the illustrated configuration.

A download apparatus comprises a processing unit 10, a non-volatile storage unit 32, a volatile storage unit 34, and an external interface (external I/F) 16, which are mutually connected via a data bus 20 capable of communicating a control signal, a program, data information, or the like. The processing unit 10 ports software stored in the non-volatile storage unit 32 into the volatile storage unit 34 for executing, and executes a program contained in the extracted software in the volatile storage unit 34, thereby performing processing. The non-volatile storage unit 32 stores software containing a control program and a downloader. The external interface 16 is connected with an external apparatus 18 for providing a new software in a communicable manner so as to allow download of the new software into the non-volatile storage unit 32.

The processing unit 10 examines a status of the apparatus and changes a process to be carried out in accordance with a status flag, which indicates any one of the following statuses of the download apparatus: Status 0: a status before starting normal operation; Status 1: a status before starting a download process of new software; Status 2: a status in which only an auxiliary downloader is downloaded in the non-volatile storage unit 32; Status 3: a status in which new software is downloaded in a storage region of the non-volatile storage unit 32 other than the storage region storing the auxiliary downloader. The auxiliary downloader will be described below in detail.

The status flag can be set by a user through an input unit which is separately provided or through the external apparatus 18 connected via the external interface 16. At this point, the status flag is set to 0 when normal control is to be started and is set to 1 when the download process of new software is to be started. The status values can be stored within the storage region of the non-volatile storage unit 32, for example.

<Download Process>

Figure 2:
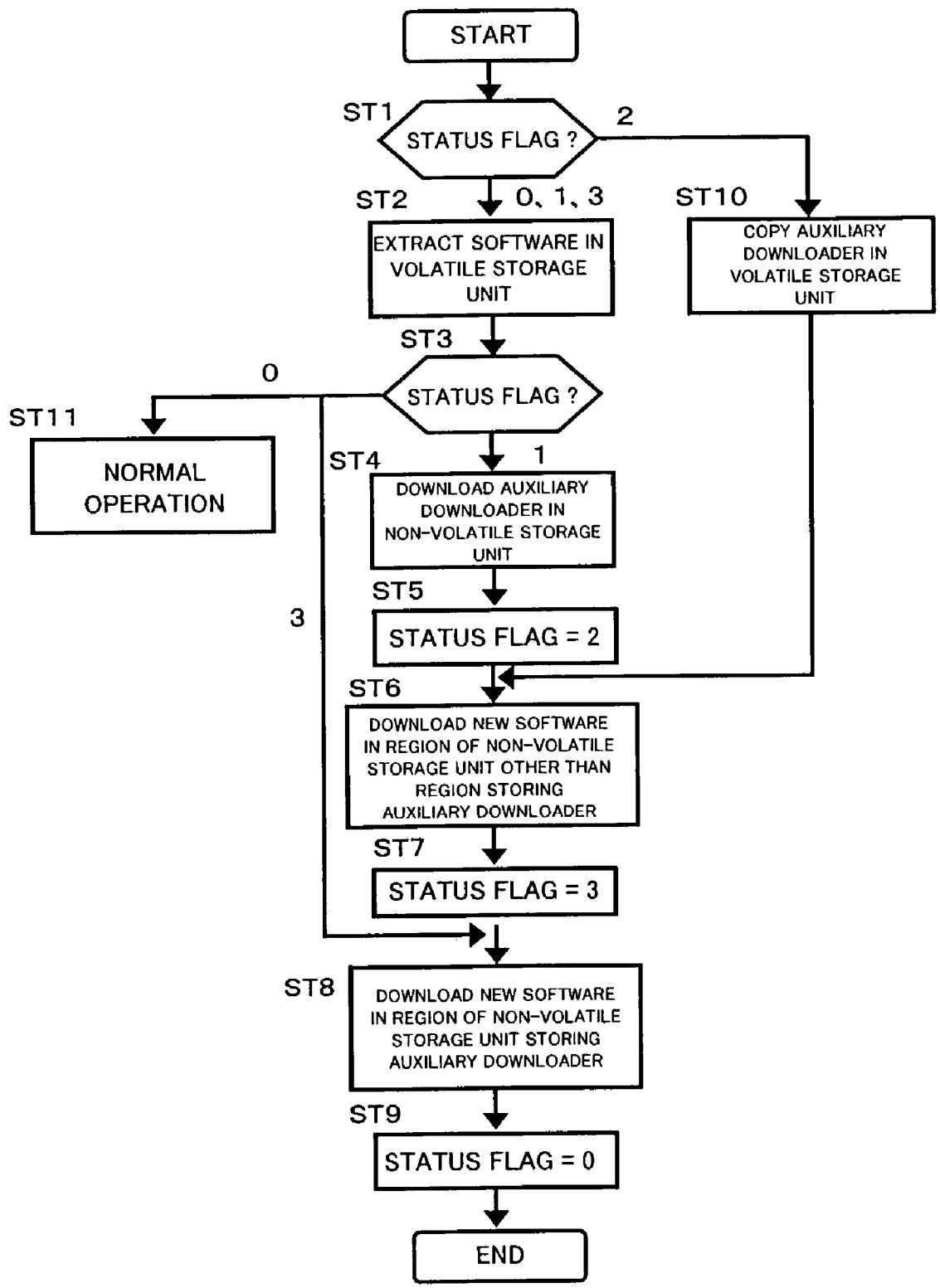
FIG. 2 is a flowchart showing a download method according to the embodiment of the present invention.

FIG. 2 is a flowchart showing a download method according to the present embodiment, and FIGS. 3A to 3D show the content of the non-volatile storage unit 32 and the volatile storage unit 34 of the information processing apparatus of the present embodiment. The software download process will be described with reference to these FIGS. 2 and 3A to 3D.

At step ST1, the processing unit 10 examines the status. If the status flag is 0, 1, or 3, the process proceeds to step ST2. If the status flag is 2, the process moves to step ST10.

When the status is set to 0, 1, or 3, pre-update software 36 containing a control program and a pre-update downloader 22, which is stored in the non-volatile storage unit 32, is replicated and stored in the volatile storage unit 34. Here, the pre-update software 36 may be stored in the non-volatile storage unit 32 in a compressed form. When the pre-update software 36 is compressed, the software 36 is extracted in an executable state and then copied from the non-volatile storage unit 32 to the volatile storage unit 34.

At step ST3, the processing unit 10 reexamines the status flag. If the status flag is 0, the process proceeds to step ST11, if the status flag is 1, the process proceeds to step ST4, and if the status flag is 3, the process proceeds to step ST8.

When the status flag is 0, at step ST11, the processing unit 10 executes the extracted control program in the volatile storage unit 34 for a normal control operation. For example, it is possible to preset, in the processing unit 10, the address of the volatile storage unit 34 where the normal control program is stored and execute the control program located at this address.

When the status flag is 1, the processing unit 10 executes the pre-update downloader 22 contained in the pre-update software 36 stored in the volatile storage unit 34 and performs the following process. For example, the address of the volatile storage unit 34 where the pre-update downloader 22 is stored can be preset in the processing unit 10, so that the pre-update downloader 22 located at this address can be executed.

At step ST4, as shown in FIG. 3B, an auxiliary downloader 38 is downloaded from the external apparatus 18 onto the nonvolatile storage unit 32 via the external interface 16. After the auxiliary downloader 38 is downloaded, the status flag is set to 2 at step ST5.

At stet ST6, as shown in FIG. 3C, new software 40 containing a new downloader 42 is downloaded onto a region of the non-volatile storage unit 32 other than the region where the auxiliary downloader 38 is stored. When the download process of step ST6 has successfully completed, the status flag is set to 3 at step ST7.

At step ST8, as shown in FIG. 3D, the remaining portion of the new software 40 is downloaded in the storage region of the non-volatile storage unit 32 to which the auxiliary downloader 38 has been downloaded. When the download process of step ST8 has been normally completed, the status flag is set to 0 at step ST9.

An example wherein, after the auxiliary downloader 38 is downloaded, the download process is abnormally interrupted while the new software 40 is being downloaded to a region other than the storage region where the auxiliary downloader 38 is stored, will be described. It is assumed that at this time the content of the volatile storage unit 34 is erased by the process interruption and the status flag is set to 2.

Figure 4A:
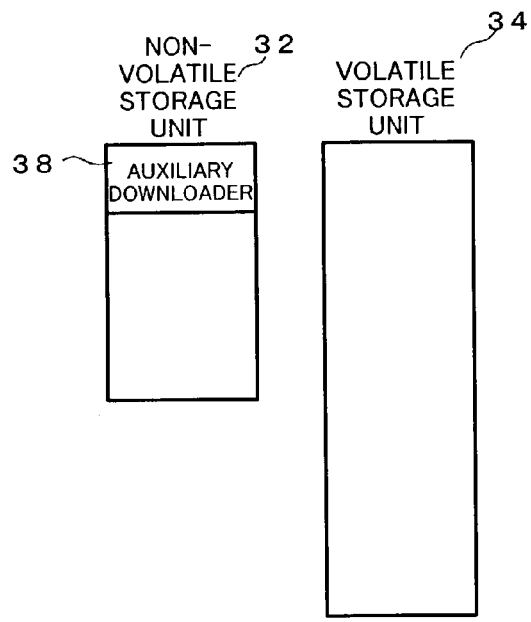
FIGS. 4A to 4D are views showing the content of each storage unit during the download process according to the embodiment of the present invention.

FIGS. 4A to 4D show the content of the non-volatile storage unit 32 and the volatile storage unit 34 during the download process. Referring to FIG. 4A, the replicated pre-update software 36 has been erased from the volatile storage unit 34.

At step ST1, the processing unit 10 again examines the status. As the status flag is 2, the process is shifted to the step ST10, where the auxiliary downloader 38 stored in the nonvolatile storage unit 32 is extracted into the volatile storage unit 34. The processing unit 10 then executes the auxiliary downloader 38. For example, by presetting the address of the non-volatile storage unit 32 where the auxiliary downloader 38 is stored in the processing unit 10, it is possible to extract the auxiliary downloader 38 located at the address into the volatile storage unit 34 and execute the auxiliary downloader 38, when the status flag is 2.

The following steps will be performed when the auxiliary downloader 38 is executed.

Figure 4C:
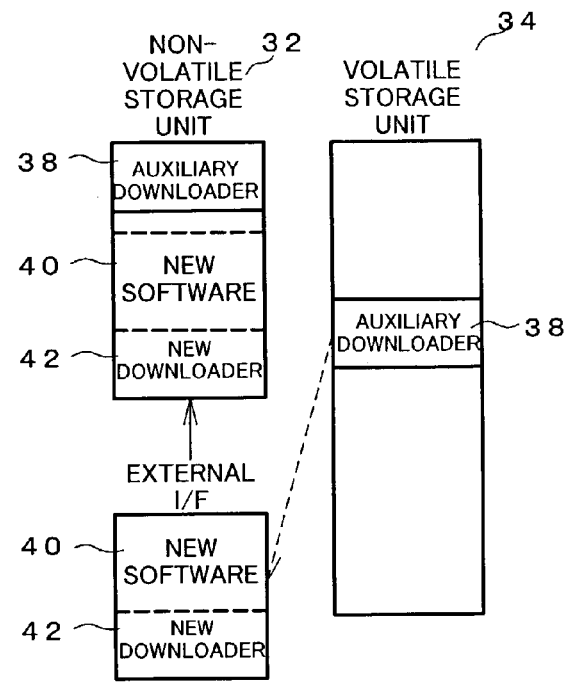
Figure 4B:
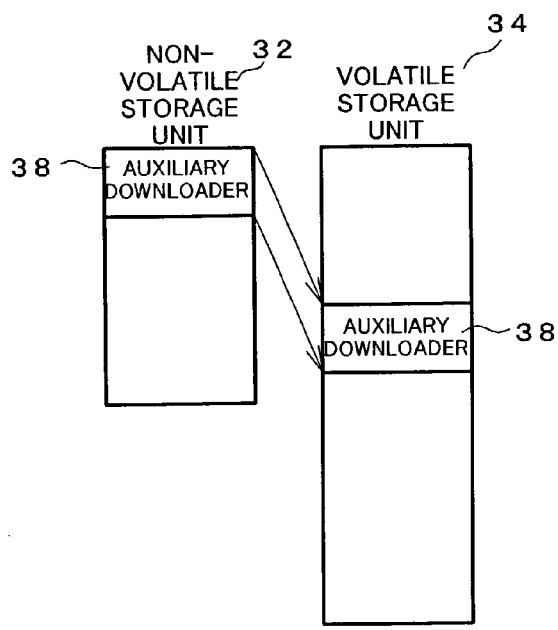

At step ST6, as shown in FIG. 4C, the new software 40 containing the new downloader 42 is downloaded from the external apparatus 18 via the external interface 16, into a storage region of the non-volatile storage unit 32 other than the region where the auxiliary downloader 38 is stored. When the download process of step ST6 has completed normally, the status flag is set to 3 at step ST7.

Figure 4D:
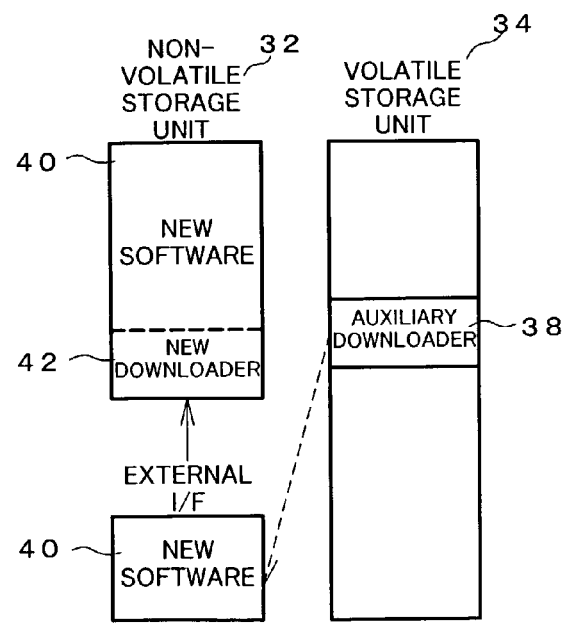

At step ST8, as shown in FIG. 4D, the remaining portion of the new software 40 is downloaded from the external apparatus 18 through the external interface 16 into the storage region of the non-volatile storage unit 32 where the auxiliary downloader 38 is stored. When the download process of step ST8 has normally completed, the status flag is set to 0 at step ST9.

An example wherein the download process is abnormally interrupted after the auxiliary downloader 38 is downloaded and the new software 40 is downloaded in the storage region other than where the auxiliary downloader 38 is stored will next be described.

Referring to FIG. 5, the content of the non-volatile storage unit 32 and the volatile storage unit 34 is illustrated. As shown in FIG. 5A, the extracted pre-update software 36 in the volatile storage unit 34 has been erased.

At step ST1, the processing unit 10 examines the status. As the status flag is 3, the process is shifted to step ST2 where the new software 40 containing the new downloader 42 is extracted from the non-volatile storage unit 32 into the volatile storage unit 34. The processing unit 10 executes the new downloader 42 contained in the extracted new software 40 in the volatile storage unit 34. For example, by presetting the address of the volatile storage unit 34 where the new downloader 42 is stored in the processing section 10, it is possible to execute the new downloader 42 when the status flag is 3.

The following steps will be performed when the new downloader 42 is executed.

At step ST3, the processing unit 10 reexamines the status and the process proceeds to step ST8. At step ST8, as shown in FIG. 5C, the remaining portion of the new software 40 is downloaded in the storage region of the non-volatile storage unit 32 where the auxiliary downloader 38 is stored. When the download process of step ST8 has normally completed, the status flag is set to 0 at step ST9.

As described above, according to the present embodiment, even when the download process is abnormally interrupted, the software for the information processing apparatus can be downloaded stably and without error. In addition, download of the pre-update downloader 22 itself can also be performed.

Further, when the new software 40 is downloaded successfully, all the steps required for the download process can be performed by executing only the downloader 22, which eliminates any need to switch downloaders. Because the user need not restart the apparatus, for example, it is therefore possible to perform a high-speed download operation.

In addition, because the pre-update downloader 22, the auxiliary downloader 38, or the new downloader 42 stored in the non-volatile storage unit 32 is extracted and stored in the volatile storage unit 34 for the download process, the software can be stored in the non-volatile storage unit 32 in a compressed form. It is therefore possible to reduce the storage capacity of the non-volatile storage unit 32, which enables further reduction of the size, weight, and manufacturing cost of the information processing apparatus.

Figure 6:
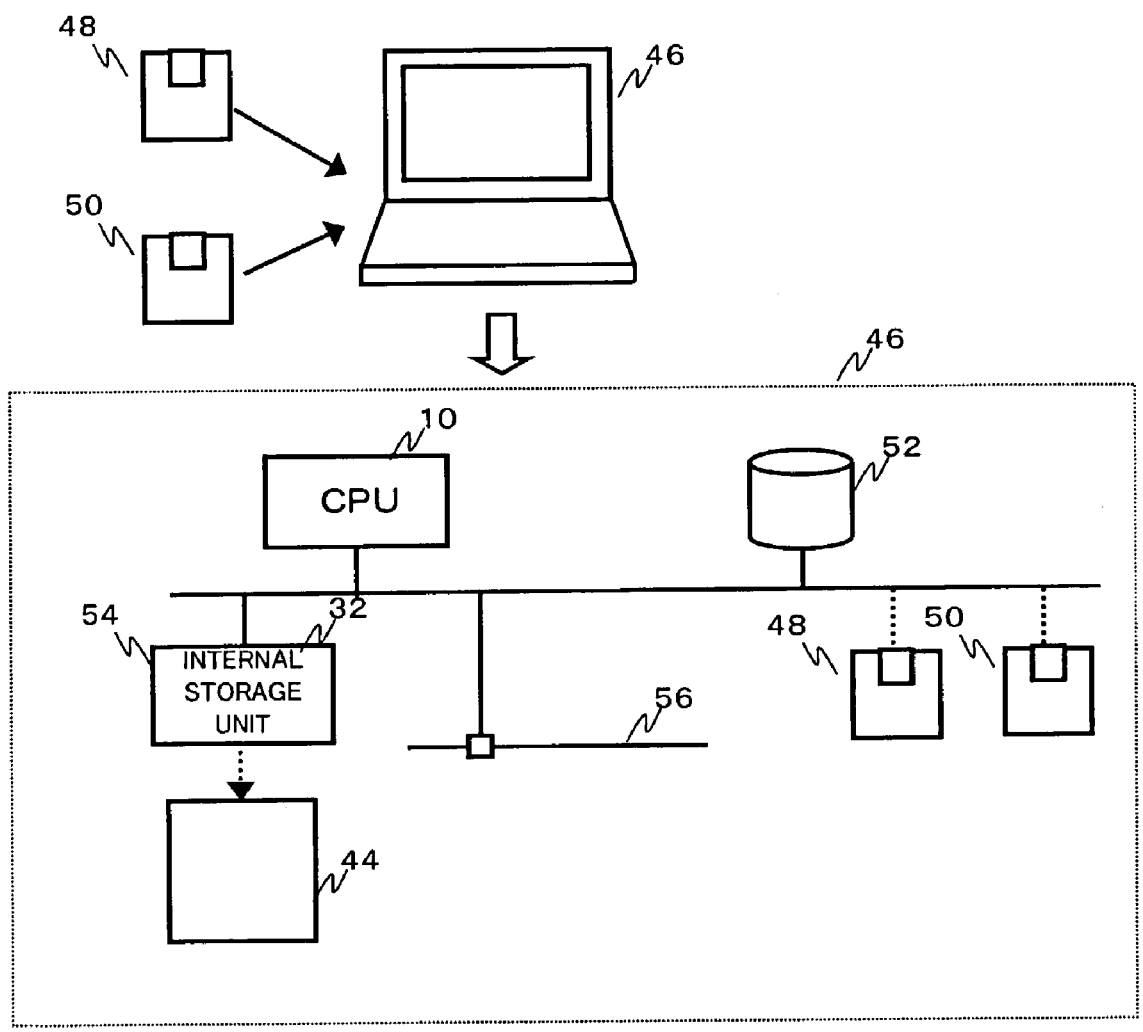
FIG. 6 is a view showing an aspect using a download program and an associated storage medium according to the embodiment of the present invention.
Figure 7:
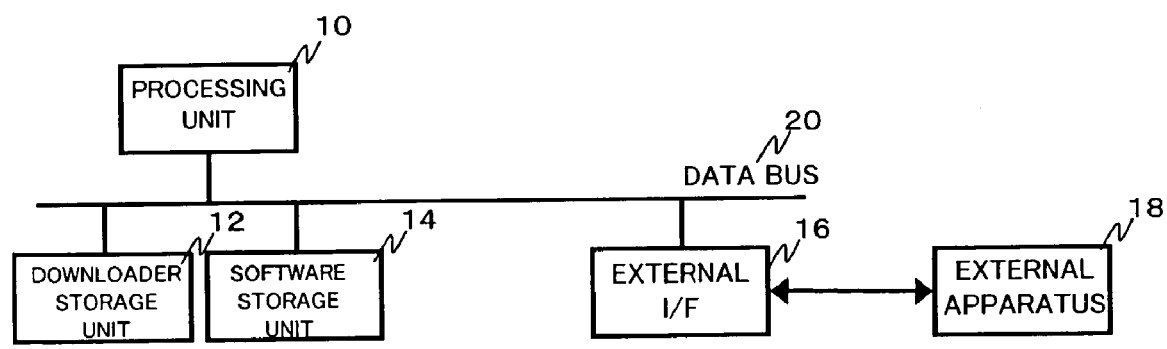
FIG. 7 is a block diagram showing a configuration of an information processing apparatus according to a first related art.
Figure 8A:
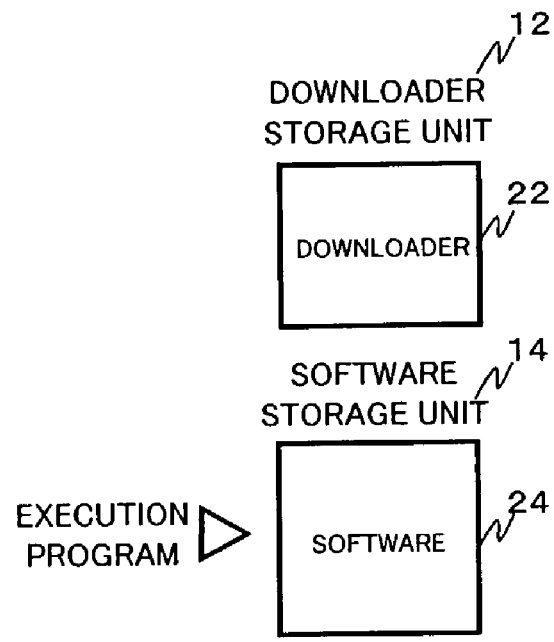
FIGS. 8A and 8B are views showing the content of each storage unit during the download process according to the first related art.
Figure 8B:
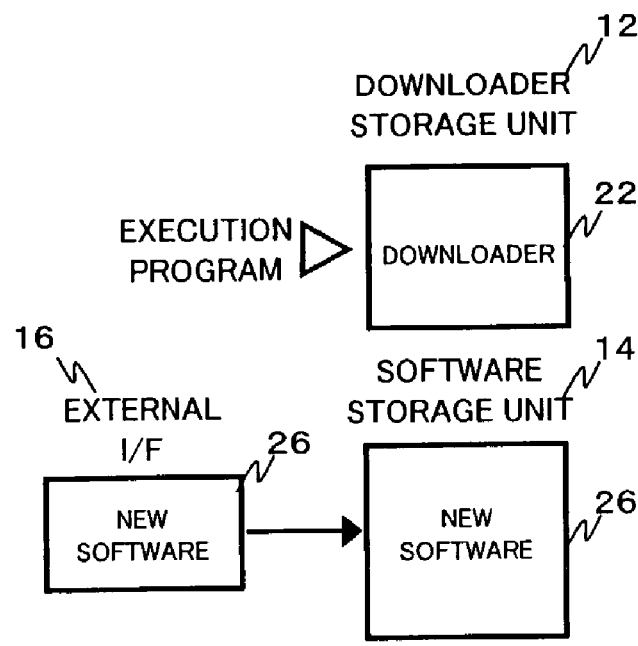
Figure 9:
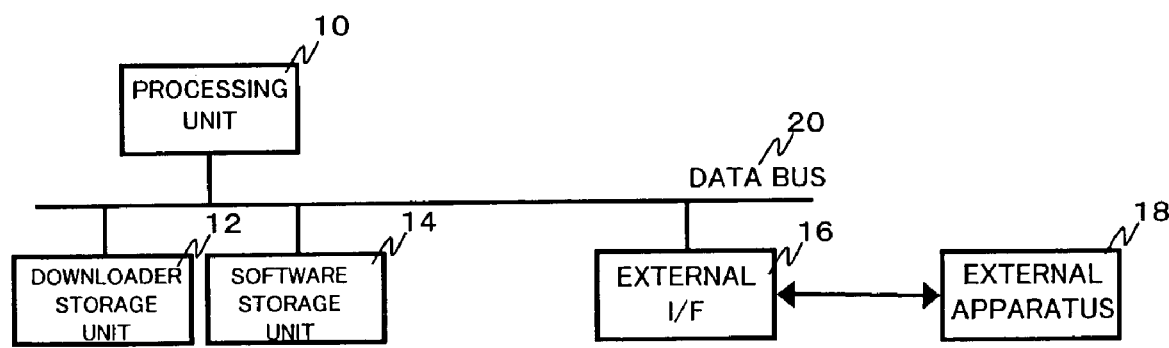
FIG. 9 is a block diagram showing a configuration of an information processing apparatus according to a second related art.
Figure 10A:
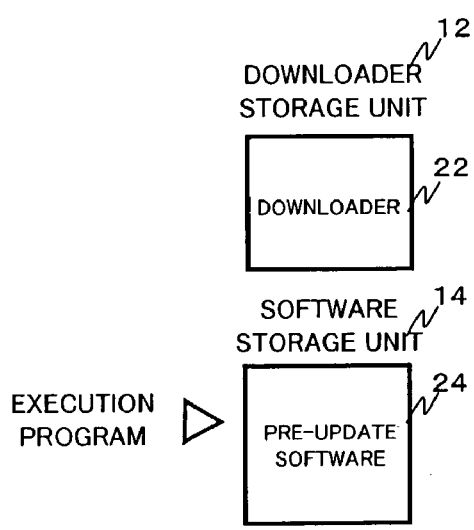
FIGS. 10A to 10D are views showing the content of each storage unit during the download process according to the second related art.
Figure 10C:
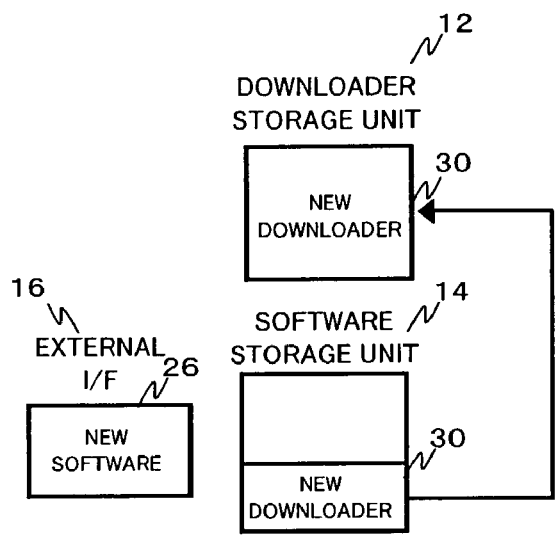
Figure 10B:
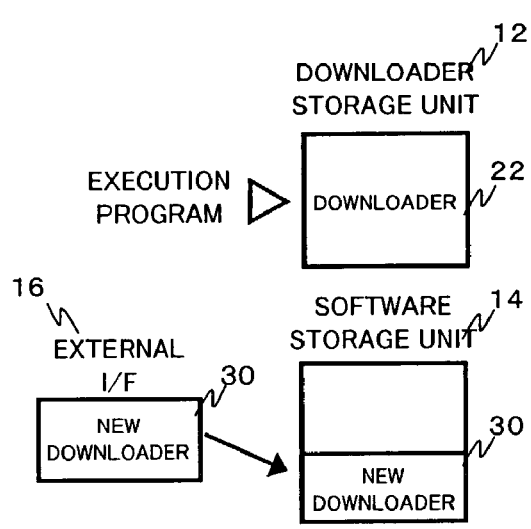
Figure 10D:
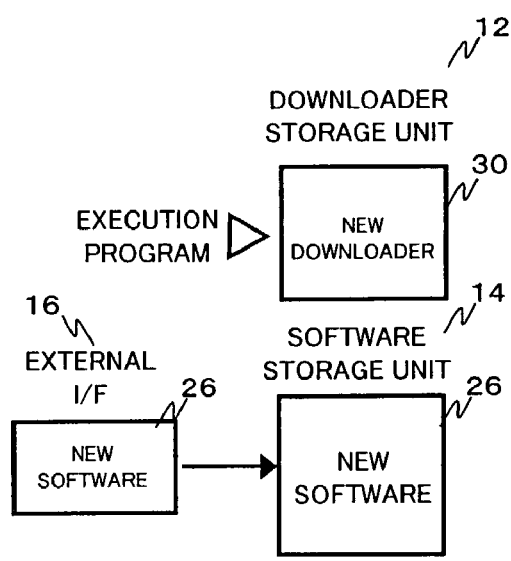

Referring to FIG. 6, it is also possible to perform each step of the download method of the present embodiment by causing the CPU 10 to execute a download program 44 stored in an internal storage apparatus of a computer 46. In such a case, advantages similar to those described above can be obtained. Similar advantages can also be achieved by causing the computer 46 to read and execute the download program 46 recorded in a computer readable recording medium.

The recording medium may be an external storage device such as, for example, a flexible disk 48, a magneto-optical disk 50, or a hard disk 52, or may be an internal storage device 54 such as a semiconductor memory or flash memory. It is also possible to configure a system such that the download program 44 is retrieved from a storage unit connected to the network 56 to the computer 46.

EXAMPLE 1

Figure 11:
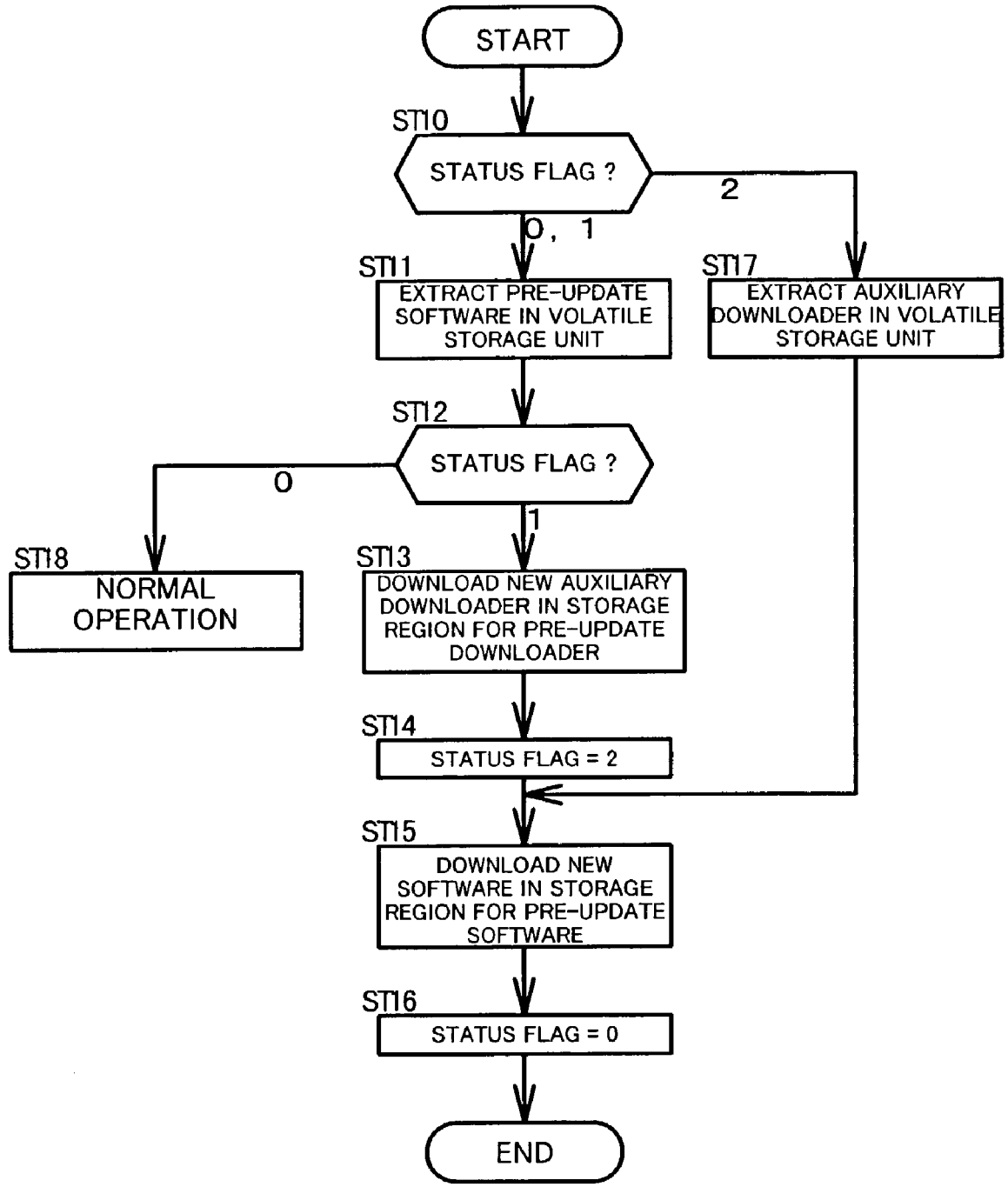
FIG. 11 is a flowchart showing a download method according to a first modified example of the embodiment of the present invention.

A first example of modification of the present embodiment will be described in detail with reference to the drawings. FIG. 11 is a flowchart showing the download method according to Example 1. FIGS. 12A to 12C show the content of the non-volatile storage unit 32 and the volatile storage unit 34 of an information processing apparatus of Example 1.

Referring to FIG. 12A, the non-volatile storage unit 32 has a sufficient storage capacity for storing both pre-update software 36 containing a pre-update downloader 22 and a pre-update auxiliary downloader 58.

At step ST10, the processing unit 10 examines the status. If the status flag is 0 or 1, the process proceeds to step ST11. If the status flag is 2, the process proceeds to step ST17.

When the status flag is 0 or 1, as shown in FIG. 12A, the pre-update software 36 containing a control program and the pre-update downloader 22 which is stored in the non-volatile storage unit 32, are extracted and input to the volatile storage unit 34. The step ST11 can be performed in a manner similar to the above-described step ST2.

At step ST12, the processing unit 10 reexamines the status flag. If the status flag is 0, the process proceeds to step ST18 and normal control is performed. If the status flag is 1, the process proceeds to step ST13.

When the status flag is 1, the processing unit 10 executes the pre-update downloader 22 contained in the extracted pre-update software 36 which is stored in the volatile storage unit 34, and performs the following steps.

At step ST13, as shown in FIG. 12B, a new auxiliary downloader 60 is downloaded, via the external interface 16, from an external apparatus 18 in a region of the non-volatile storage unit 32 where the pre-update auxiliary downloader 58 is stored. After the new auxiliary downloader 60 is downloaded, the status flag is set to 2 at step ST14.

At step 15, as shown in FIG. 12C, new software 40 containing a new downloader 42 is downloaded from the external apparatus 18 into the region of the non-volatile storage unit 32 where the pre-update software 36 is stored. When the process of step ST15 has normally completed, the status flag is reset to 0 at step ST16.

According to the present example, when the process is interrupted in an abnormal state before completion of downloading of the new software 40 and after the new auxiliary downloader 60 has been downloaded and the pre-update software 36 stored in the volatile storage unit 34 has been erased, the process resumes with the status value being set to 2.

In such a case, the process shifts from step ST10 to step ST17, where the new auxiliary downloader 60 is replicated in the volatile storage unit 34. By executing the new auxiliary downloader 60, step ST15 and the subsequent steps are performed. The new auxiliary downloader 60 may be compressed or uncompressed. When compressed, the new auxiliary downloader 60 is extracted before being copied into the volatile storage unit 34.

At this point, it is also possible to directly execute the new auxiliary downloader 60 stored in the non-volatile storage unit 32 rather than to replicate the new auxiliary downloader 60 into the volatile storage unit 34.

As described above, according to the modification example 1, as the auxiliary downloader need not be stored temporarily in the non-volatile storage unit, the new software and the new auxiliary downloader can be rapidly updated.

Further, when software updating is not performed, one of the two downloaders, namely the downloader contained in the software and the auxiliary downloader, can be used to update just the remaining downloader.

EXAMPLE 2

Figure 13:
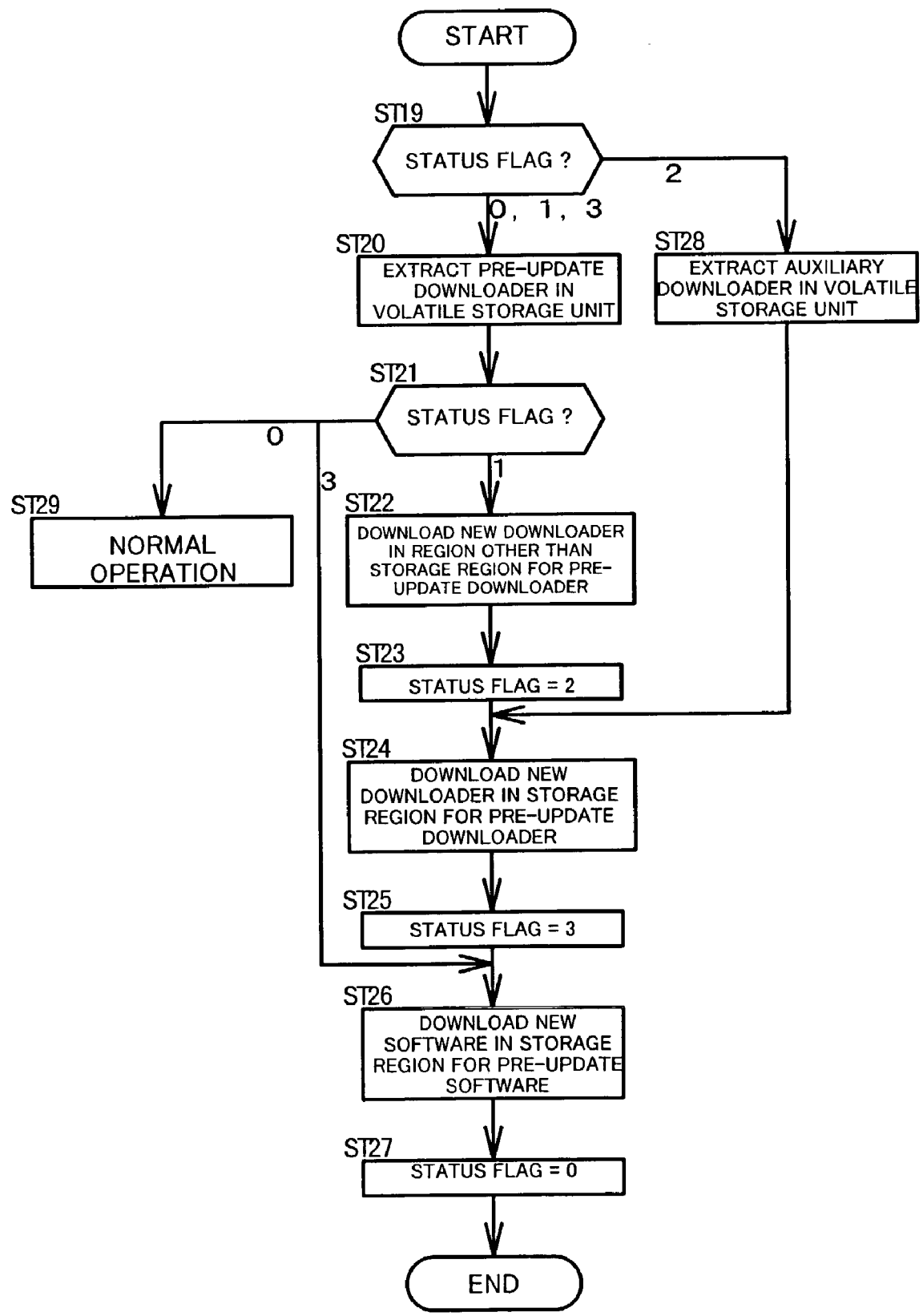
FIG. 13 is a flowchart showing a download method according to a second modified example of the embodiment of the present invention.

A second example of the present embodiment will be described in detail with reference to the drawings. FIG. 13 is a flowchart showing the download method according to Example 2, and FIGS. 14A to 14D show the content of the non-volatile storage unit 32 and the volatile storage unit 34.

At step ST19, the processing unit 19 examines the status. If the status flag is 0, 1, or 3, the process proceeds to the step ST20. If the status flag is 2, the process proceeds to step ST28.

Figure 14A:
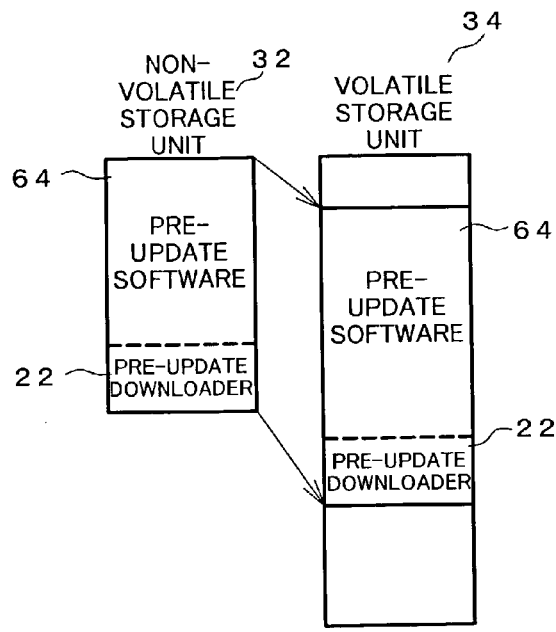
FIGS. 14A to 14D are views showing the content of each storage unit during the download process according to the second modified example of the embodiment of the present invention.
Figure 14B:
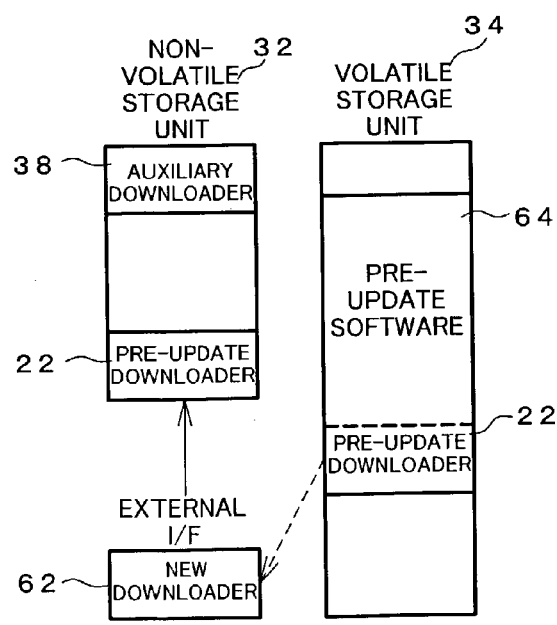
Figure 14C:
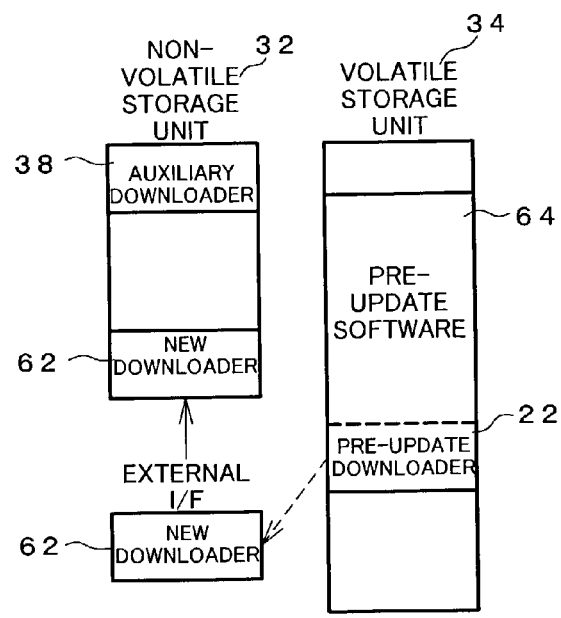
Figure 14D:
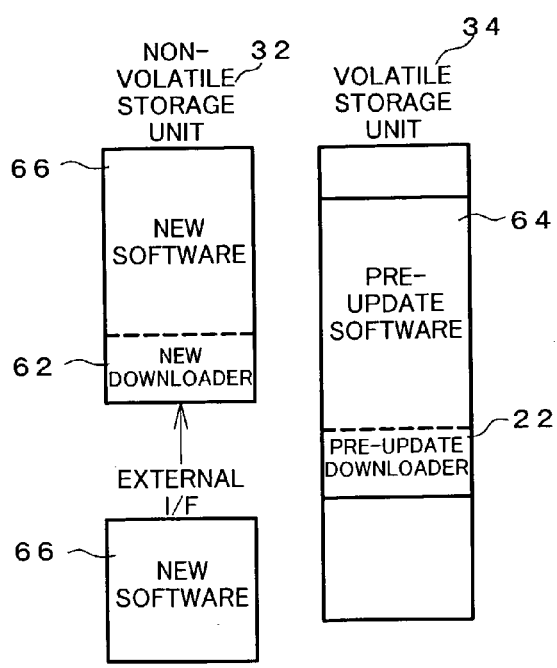

When the status is 0, 1, or 3, as shown in FIG. 14A, the pre-update software 64 containing the control program and the pre-update downloader 22, which is stored in the non-volatile storage unit 32, are extracted and stored in the volatile storage unit 34 at step ST20. Step ST20 can be performed in a manner similar to the above-described steps ST11 and ST2.

At step ST21, the processing unit 10 again reexamines the status flag. If the status flag is 0, the process proceeds to step ST29, and normal operation is performed. If the status flag is 1, the process proceeds to step ST22. If the status flag is 3, the process proceeds to step ST26.

When the status flag is 1, the processing unit 10 executes the pre-update downloader 22 contained in the pre-update software 64, which is stored in the volatile storage unit 34, and performs the following process.

At step ST22, new downloader 62 is downloaded, as an auxiliary downloader 38, in a region of the non-volatile storage unit 32 other than the storage region where the pre-update downloader 22 is stored. After the auxiliary downloader 38 is downloaded, the status flag is set to 2 at step ST23.

At step ST24, the new downloader 62 is further downloaded in the region of the non-volatile storage unit 32 where the pre-update downloader 22 is stored. After the new downloader 62 is downloaded, the status flag is set to 3 at step ST25.

At step ST26, new software 66 is downloaded in the region of the non-volatile storage unit 32 where the pre-update software was stored. When the process of step ST26 has completed normally, the status flag is reset to 0 at step ST27.

According to Example 2, when the process is abnormally interrupted before download of the new downloader 62 has completed, but after the auxiliary downloader 38 has been downloaded and the pre-update software 64 and the pre-update downloader 22 stored in the volatile storage unit 34 have been erased, the process resumes with the status flag being set to 2.

In such a case, the process shifts from the step ST19 to step ST28 where the auxiliary downloader 38 stored in the nonvolatile storage unit 32 is extracted into the volatile storage unit 34. When the extracted auxiliary downloader 38 is executed, the processes in step ST24 and the subsequent steps are performed.

On the other hand, in this Example 2, which is a modification of the present embodiment, when the process is abnormally interrupted before download of the new software 66 has been completed, after the new downloader 62 has been downloaded, and after the pre-update software 64 and the pre-update downloader 22 stored in the volatile storage unit 34 has been erased, the process resumes with the status flag being set to 3.

In such a case, the process proceeds from the step ST21 to step ST26 where the new downloader 62 stored in the non-volatile storage unit 32 is extracted and stored in the volatile storage unit 34. By executing the new downloader 62, the processes in step ST26 and the subsequent steps are performed.

As described above, according to the example, the software size can be further reduced because a downloader itself is not contained in the software. Further, when the software is compressed, by storing a downloader having a relatively small size in an uncompressed state, the need for extracting the entire software can be eliminated, and copying of downloader into the volatile storage unit 34 is all that is required to start the software update process. Consequently, the storage region can be significantly reduced and time required for extracting the software can also be reduced.

Further, because the software and the downloader are substantially separated, it is possible to update the software alone when updating of the downloader is not necessary.

According to the present invention, software for an information processing apparatus can be downloaded stably and without error. Also, downloading of the downloader itself contained in the software is possible.

Further, when the download process is normally performed, there is no need to switch between downloaders, or for the user to perform any downloader shift operation, such as restarting of the apparatus.

Moreover, the storage capacity of the non-volatile storage unit of the information processing apparatus can be reduced, thereby enabling reduction of the size, weight, and manufacturing cost of the information processing apparatus.

While the preferred embodiment of the present invention has been described using specific terms, such description is for illustrative purposes only, and it is to be understood that changes and variations may be made without departing from the spirit or scope of the appended claims.

What is claimed is:

1. An information processing apparatus having a memory in which a downloader is previously stored, the apparatus comprising:
   auxiliary downloader memory that stores an auxiliary downloader in the memory when the downloader stored in the memory is executed;
   new software memory that stores new software in a region of the memory other than the storage region where the auxiliary downloader is stored by the auxiliary downloader memory; and
   downloader start unit that executes the stored auxiliary downloader when storage of the new software by the new software memory fails,
   wherein the downloader and the auxiliary downloader reside in the same information processing apparatus.

2. An information processing apparatus according to claim 1, wherein
   the new software memory stores new software containing a downloader.

3. An information processing apparatus according to claim 1, wherein
   the new software memory stores a new downloader contained in the new software in a region of the memory other than the storage region where the auxiliary downloader is stored by the auxiliary downloader memory, and then stores the remaining portion of the new software in a region of the memory other than the storage region where the new downloader is stored, and
   the downloader start unit starts the auxiliary downloader when download fails before the new downloader is stored in the memory and starts the new downloader when download fails after the new downloader is stored in the memory, in the new software memory.

4. An information processing apparatus according to claim 1, wherein
   the memory is a non-volatile memory.

5. An information processing apparatus having a memory in which a downloader is previously stored, the apparatus comprising:
   auxiliary downloader memory that stores a first auxiliary downloader which is not compressed in the memory and then storing a second auxiliary downloader in a region of the memory other than the storage region where the first auxiliary downloader is stored when the downloader stored in the memory is executed;
   new software memory that stores new software in a region of the memory other than the storage region where the first or second auxiliary downloader is stored by the auxiliary downloader memory; and
   downloader memory that executes either the first or second auxiliary downloader when storage of the new software by the new software memory fails,
   wherein the downloader, the first auxiliary downloader, and the second auxiliary downloader reside in the same information processing apparatus.

6. In an information processing apparatus having a memory in which a downloader is previously stored, a download method for storing new software in the memory, the method comprising:
   storing an auxiliary downloader in the memory by executing the downloader stored in the memory, the auxiliary downloader being stored in the same information processing apparatus as the downloader;
   storing new software in a region of the memory other than the storage region where the auxiliary downloader is stored; and
   executing the auxiliary downloader when storage of the new software fails.

7. A download method according to claim 6, wherein the new software contains a downloader.

8. A download method according to claim 6, wherein
   the step of storing the new software includes storing a new downloader contained in the new software in a region of the memory other than the storage region where the auxiliary downloader is stored, and then storing the remaining portion of the new software in a region of the memory other than the storage region where the new downloader is stored, and
   the step of executing the auxiliary downloader includes starting the auxiliary downloader when download fails before the new downloader is stored in the memory, and starting the new downloader when download fails after the new downloader is stored in the memory.

9. A download method according to claim 6, wherein the memory is a non-volatile memory.

10. In an information processing apparatus having a memory in which a downloader is previously stored, a download method for storing new software in the memory, the method comprising:
    storing a first auxiliary downloader which is not compressed in the memory and then storing a second auxiliary downloader in a region of the memory other than the storage region where the first auxiliary downloader is stored by executing the downloader stored in the memory, the first auxiliary downloader and the second auxiliary downloader being stored in the same information processing apparatus as the downloader;
    storing new software in a region of the memory other than the storage region where the first or second auxiliary downloader is stored; and
    executing either the first or second auxiliary downloader when storage of the new software fails.

11. In an information processing apparatus having a memory in which a downloader is previously stored, a download program product for storing new software in the memory, the download program product causing a computer to carry out a process including:
    storing an auxiliary downloader in the memory by executing the downloader stored in the memory, the auxiliary downloader being stored in the same information processing apparatus as the downloader;
    storing new software in a region of the memory other than the storage region where the auxiliary downloader is stored; and
    executing the auxiliary downloader when storage of the new software fails.

12. A download program product according to claim 11, wherein
the new software contains a downloader.

13. A download program product according to claim 11, wherein
the step of storing the new software includes storing a new downloader contained in the new software in a region of the memory other than the storage region where the auxiliary downloader is stored, and then storing the remaining portion of the new software in a region of the memory other than the storage region where the new downloader is stored, and
the step of executing the auxiliary downloader includes starting the auxiliary downloader when download fails before the new downloader is stored in the memory and starting the new downloader when download fails after the new downloader is stored in the memory.

14. A download program product according to claim 11, wherein
the memory is a non-volatile memory.

15. In an information processing apparatus having a memory in which a downloader is previously stored, a download program product for storing new software in the memory, the download program product causing a computer to perform a process comprising:
storing a first auxiliary downloader which is not compressed in the memory and then storing a second auxiliary downloader in a region of the memory other than the storage region where the first auxiliary downloader is stored by executing the downloader stored in the memory, the first auxiliary downloader and the second auxiliary downloader being stored in the same information processing apparatus as the downloader;
storing new software in a region of the memory other than the storage region where the first or second auxiliary downloader is stored; and
executing either the first or second auxiliary downloader when storage of the new software fails.

* * * * *